(12) United States Patent
Guillanton et al.

(10) Patent No.: US 10,476,207 B2
(45) Date of Patent: Nov. 12, 2019

(54) ELECTRICAL DISTRIBUTION ASSEMBLY

(71) Applicant: Aptiv Technologies Limited, Bishop's Court Hill (BB)

(72) Inventors: Erwan Guillanton, Epernon (FR); Aymeric Perot, Epernon (FR)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 16/196,483

(22) Filed: Nov. 20, 2018

(65) Prior Publication Data

US 2019/0181589 A1  Jun. 13, 2019

(30) Foreign Application Priority Data

Dec. 13, 2017 (EP) .................................... 17207125

(51) Int. Cl.
| | |
|---|---|
| *H01R 3/00* | (2006.01) |
| *H01R 13/64* | (2006.01) |
| *H01R 13/502* | (2006.01) |
| *H01R 13/631* | (2006.01) |
| *H01R 25/00* | (2006.01) |

(Continued)

(52) U.S. Cl.
CPC ......... *H01R 13/64* (2013.01); *H01R 13/5025* (2013.01); *H01R 13/631* (2013.01); *H01R 25/003* (2013.01); *H01R 43/20* (2013.01); *B60K 6/22* (2013.01); *B60L 50/50* (2019.02); *B60R 16/0238* (2013.01); *B60Y 2200/91* (2013.01); *B60Y 2200/92* (2013.01); *H01R 43/26* (2013.01); *H01R 2201/26* (2013.01)

(58) Field of Classification Search
CPC ............... H01R 13/465; H01R 13/641; H01R 13/4223; H01R 13/4362
USPC .................................. 439/488, 489, 595, 752
See application file for complete search history.

(56) References Cited

U.S. PATENT DOCUMENTS 4,806,123 A * 2/1989 Konishi ............. H01R 13/4364
439/595
4,973,268 A  11/1990 Smith et al.
(Continued)

FOREIGN PATENT DOCUMENTS

| EP | 649028 A1 | 4/1995 |
|---|---|---|
| EP | 1030411 A1 | 8/2000 |
| WO | 2006131610 A1 | 12/2006 |

*Primary Examiner* — Thanh Tam T Le
(74) *Attorney, Agent, or Firm* — Robert J. Myers

(57) ABSTRACT

An electrical distribution assembly comprising a junction box having a box housing. The box housing comprises a plug portion to receive an electrical connector. The electrical connector has a connector housing comprising a plurality of cavities to receive and hold a terminal. The plug portion comprises a plurality of first blocking devices protruding along a mating axis. Each cavity comprises a second blocking device extending along the mating axis. Each of the first blocking devices blocks the corresponding second blocking device in a blocked position when the corresponding cavity is empty, thereby preventing movement of the connector housing towards the box housing. The assembly further comprises a terminal movable from an outward position to an inserted position. When inserted in the cavity, the terminal relocates the corresponding first or second blocking device to release the blocking, thereby allowing movement of the connector housing towards the box housing.

13 Claims, 4 Drawing Sheets

(51) Int. Cl.
    *H01R 43/20*     (2006.01)
    *B60R 16/023*     (2006.01)
    *B60K 6/22*     (2007.10)
    *B60L 50/50*     (2019.01)
    *H01R 43/26*     (2006.01)

(56) References Cited

U.S. PATENT DOCUMENTS

| | | | | |
|---|---|---|---|---|
| 5,839,914 A * | 11/1998 | Watanabe | G01R 31/04 | 439/488 |
| 5,997,352 A * | 12/1999 | Newport | H01R 13/4365 | 439/595 |
| 6,102,726 A * | 8/2000 | Tsuji | H01R 13/6272 | 439/352 |
| 6,149,462 A * | 11/2000 | Sugie | H01R 13/4368 | 439/595 |
| 6,234,848 B1 * | 5/2001 | Sikora | H01R 13/4362 | 439/752 |
| 6,375,502 B2 * | 4/2002 | Yoshida | H01R 13/4223 | 439/595 |
| 7,252,556 B2 * | 8/2007 | Anbo | H01R 13/4367 | 439/357 |
| 8,678,866 B2 * | 3/2014 | Hiraishi | H01R 13/4365 | 439/595 |
| 8,784,133 B2 * | 7/2014 | Suzuki | H01R 13/4223 | 439/595 |
| 9,017,111 B2 * | 4/2015 | Zheng | H01R 13/4223 | 439/595 |
| 9,124,028 B2 * | 9/2015 | Nakashima | H01R 13/6272 | |
| 9,509,076 B2 * | 11/2016 | Hashimoto | H01R 13/422 | |
| 2009/0104805 A1 | 4/2009 | Daudin et al. | | |

* cited by examiner

ELECTRICAL DISTRIBUTION ASSEMBLY

CROSS-REFERENCE TO RELATED APPLICATION

This application claims the benefit under 35 U.S.C. § 119(a) of Patent Application No. 17207125.0 filed in the European Patent Office on Dec. 13, 2017, the entire disclosure of which is hereby incorporated by reference.

TECHNICAL FIELD OF THE INVENTION

An electrical distribution assembly for distribution of high voltage in electrical or hybrid vehicles.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
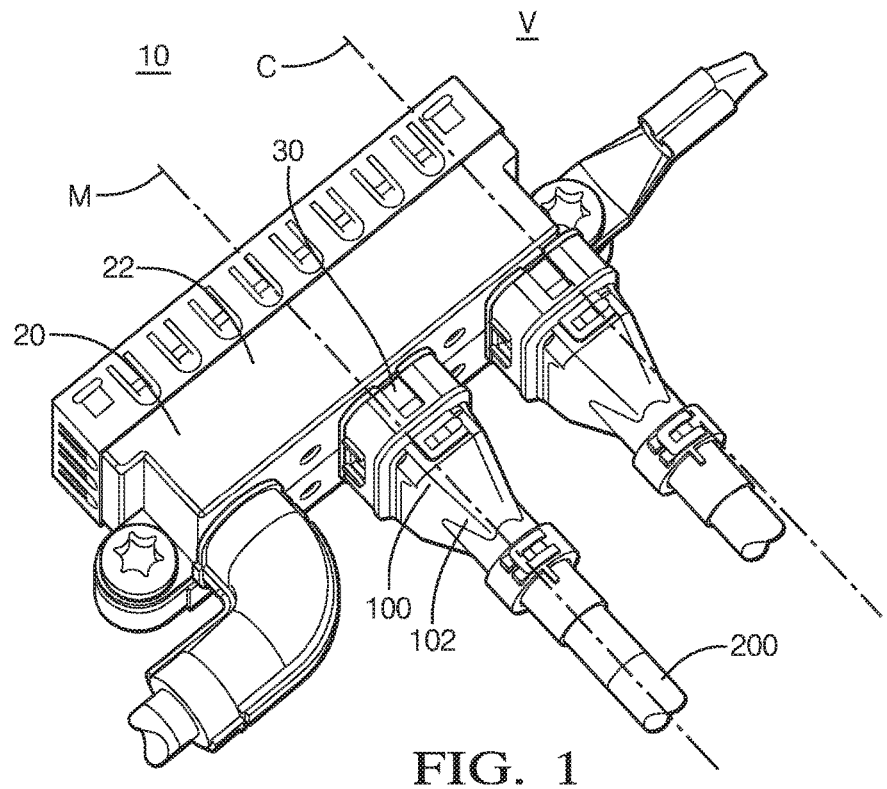
FIG. 1 shows a perspective view of an electrical distribution assembly for the distribution of high voltage in electrical or hybrid vehicles according to an embodiment of the invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

An electrical distribution assembly for the distribution of high voltage in electrical or hybrid vehicles is presented herein. The electrical distribution assembly comprises a junction box having a box housing. The box housing includes a plug portion that is configured to receive an electrical connector. The electrical connector of the electrical distribution assembly has a connector housing comprising a plurality of cavities. Each cavity in the plurality of cavities is configured to receive and hold a terminal. The plug portion comprises a plurality of first blocking means protruding along a mating axis outwards the box housing. Each cavity in the plurality of cavities comprises a second blocking means extending along the mating axis, along the cavity. Each of the first blocking means blocks the corresponding second blocking means in a blocked position when the corresponding cavity is empty, thereby preventing movement of the connector housing along the mating axis towards the box housing. The assembly further comprises at least one terminal movable from an outward position to an inserted position. Each terminal inserted in the cavity relocates the corresponding first blocking means or the corresponding second blocking means to release the blocking, thereby allowing movement of the connector housing towards the box housing, along the mating axis.

The disclosed electrical distribution assembly provides the opportunity to monitor each cavity of the electrical connector. Even only one missing or not properly inserted terminal blocks the connector while mating to a junction box. Every single blocking means has to be released by the corresponding terminal. This functionality provides an electrical distribution assembly that reliably prevents connection of electrical connectors to electrical junction boxes when the electrical connector is not equipped with the necessary terminals in the correct positions.

According to a preferred embodiment, the first blocking means comprises a rigid lance and the second blocking means comprise a flexible arm. The flexible arm is flexible in a direction perpendicular to the mating axis. The flexible arm is bendable using little force that results in a small insertion force of the electrical connector towards the junction box.

Preferably, the rigid lance has a lance end and the flexible arm has an arm end. The lance end and the arm end are configured to block each other, thereby preventing movement toward each other in the blocked position. The arm end, as well as the lance end, are configured to press against each other along the mating axis when the improper equipped connector is moved toward the electrical junction box. The simplest embodiment may be described as two flat surfaces on the two ends arranged perpendicular to the mating axis.

Advantageously, the arm end has a release protrusion protruding inwards the cavity. The terminal comprises a terminal release surface. The terminal release surface displaces the arm end by urging against the release protrusion when the terminal is received in the cavity. The arm end is positioned in an unblocked position allowing movement along the mating axis. Only a properly inserted terminal unblocks the corresponding blocking means.

Advantageously, the first blocking means comprises a flexible housing lance and the second blocking means comprises a rigid cavity protrusion protruding perpendicular to the mating axis into the cavity. The flexible housing lance is flexible in a direction perpendicular to the mating axis. In this embodiment, the flexible blocking means is arranged on the box housing, thereby providing advantages in some designs.

According to a preferred embodiment, the flexible housing lance has a housing lance end and the rigid cavity protrusion has a blocking edge. The housing lance end and the blocking edge are configured to block each other, thereby preventing movement toward each other in the blocked position. Depending on the requirements, the dimensions of the blocking means can be configured to produce robust properties.

Advantageously, the housing lance end has a housing lance release protrusion protruding perpendicularly to the mating axis towards the terminal, The terminal comprises a terminal release surface. The terminal release surface displaces the housing lance end by urging against the housing lance release protrusion when the terminal is received in the cavity. The housing lance end is positioned in an unblocked position, allowing movement along the mating axis. The displaced housing lance end has a sloped area at the housing lance release protrusion that cooperates with a sloped area of the release protrusion. The housing lance release protrusion slides along the release protrusion while the electrical connector is moved along the mating axis towards the junction box. In the fully mated position, the flexible housing lance is back in a relaxed position.

Preferably, movement of the connector housing toward the box and housing until in a fully mated position is only possible when all cavities of the connector housing are correct equipped with the intended terminals, whereby each terminal displaces each corresponding first blocking means. That makes sure that each cavity is correctly equipped with a terminal.

Preferably the junction box comprises a first final locking means and the electrical connector comprises a second final locking means. The first final locking means and the second final locking means inseparably holds the junction box and the electrical connector together when they reach their fully mated position. That fulfils a safety requirements for high voltage applications in vehicles.

In a preferred embodiment, the junction box comprises a plurality of plug portion. The plurality of plug portions is electrically interconnected by a bus bar. That provides a robust design for high voltage and high power application.

In a preferred embodiment, the connector housing comprises a guiding protrusion extending along the mating axis towards the plug portion. The box housing comprises a guiding opening configured to receive the guiding protrusion in the fully mated position. The guiding protrusion is inserted into the guiding opening at the beginning of the mating process of electrical connector an electrical junction box opening, thereby guiding the electrical connector along the mating axis. That improves handling during assembly.

Preferably, the electrical distribution assembly is configured for high voltage application using voltages of about 400 Volt. To fulfil the requirements for high voltage application the dimensions and materials of the assembly are suitably configured.

Preferred, is an electrical wire harness comprises the distribution assembly and electrical wires attached to the terminals.

FIG. 1 shows a perspective view of an electrical distribution assembly 10 configured for the distribution of high voltage electrical current in electrical or hybrid vehicles. The electrical distribution assembly 10 also includes electrical wires 200 attached to electrical terminals 150 (not shown in FIG. 1) defining a wire harness. The electrical distribution assembly 10 comprising a junction box 20 having a box housing 22. The box housing 22 comprises a plug portion 30 that is configured to receive an electrical connector 100. The electrical connector 100 of the electrical distribution assembly has a connector housing 102. The electrical connectors are arranged along a mating axis M.

Figure 2:
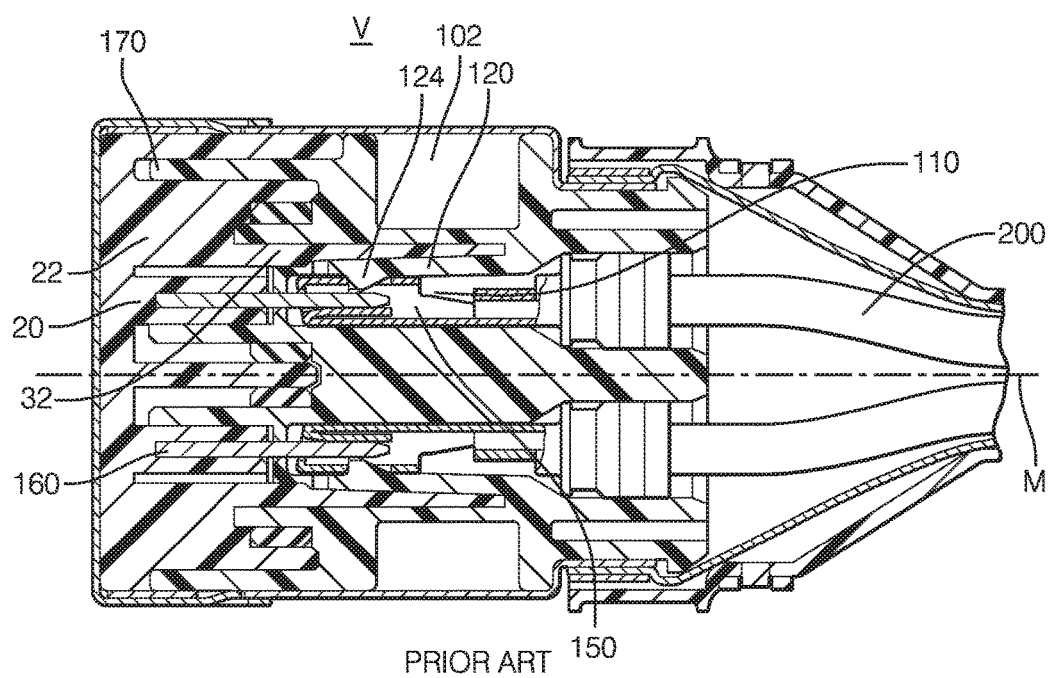
FIG. 2 shows a cross-section view of an electrical distribution assembly according to the prior art.

FIG. 2 shows a cross-section view of an electrical distribution assembly known from the prior art. The electrical distribution assembly comprises a junction box 20 having a box housing 22. The box housing 22 comprises a plug portion 30 configured to receive an electrical connector 100. The electrical connector 100 of the electrical distribution assembly has a connector housing 102. The electrical connector 100 is plugged along a mating axis M. The electrical connector 100 comprising a plurality of cavities 110, each configured to receive and hold an electrical terminal 150. Each cavity 110 comprise a flexible arm 120 having an arm end 124. The arm end 124 comprises a terminal locking protrusion that is configured to lock the terminal in the cavity 110 when the electrical connector 100 is in the fully mated position V.

Figure 3:
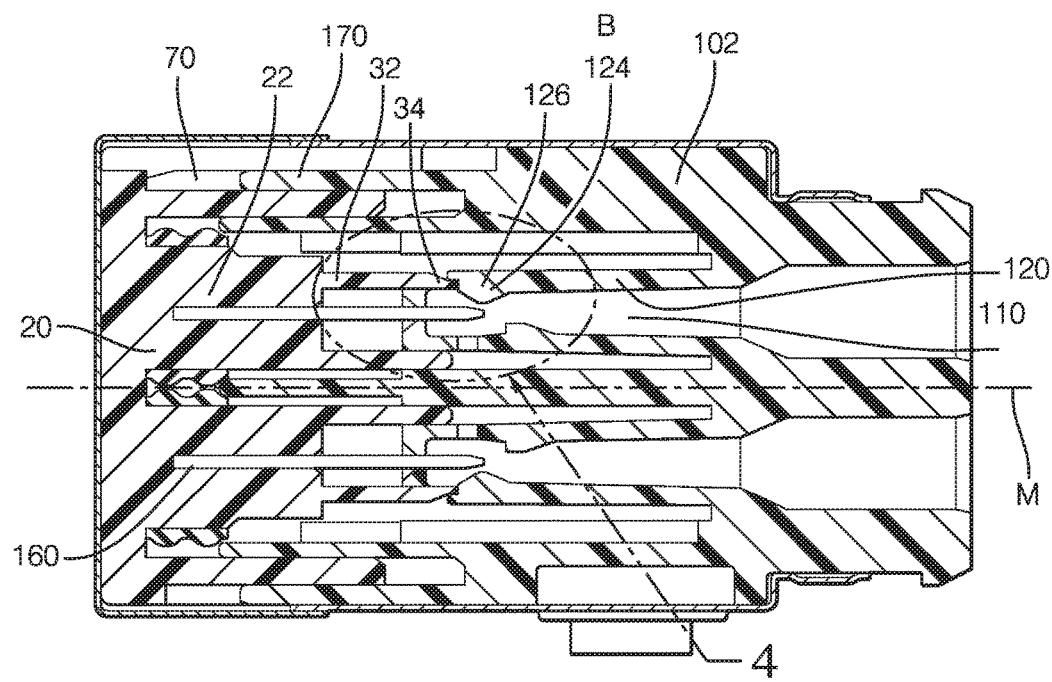
FIG. 3 shows a cross-section view of an electrical distribution assembly along cut line C, with an empty cavity according to an embodiment of the invention.

FIG. 3 shows a cross-section view of the electrical distribution assembly 10 in which the cross-section is made along line C. The electrical distribution assembly 10 is shown in a blocked position B with an empty cavity 110. The electrical distribution assembly 10 includes a junction box 20 having a box housing 22. The box housing 22 comprises a plug portion 30 configured to receive an electrical connector 100. The electrical connector 100 of the electrical distribution assembly has a connector housing 102. The electrical connector 100 is plugged along a mating axis M. The electrical connector 100 comprising a plurality of cavities 110, each configured to receive and hold an electrical terminal 150. The plug portion 30 comprises a plurality of first blocking means protruding along a mating axis M outwards the box housing 22. Each of the plurality of cavities 110 comprises a second blocking means extending along the mating axis M, along the cavity 110. Each of the first blocking means blocks the corresponding second blocking means in the blocked position B when the corresponding cavity is empty, thereby preventing movement of the connector housing 102 along the mating axis M towards the box housing 22. The connector housing 102 comprises a guiding protrusion 170 extending towards the plug portion 30. The box housing 22 comprises a guiding opening 70 configured to receive the guiding protrusion 170 in the fully mated position V.

Figure 4:
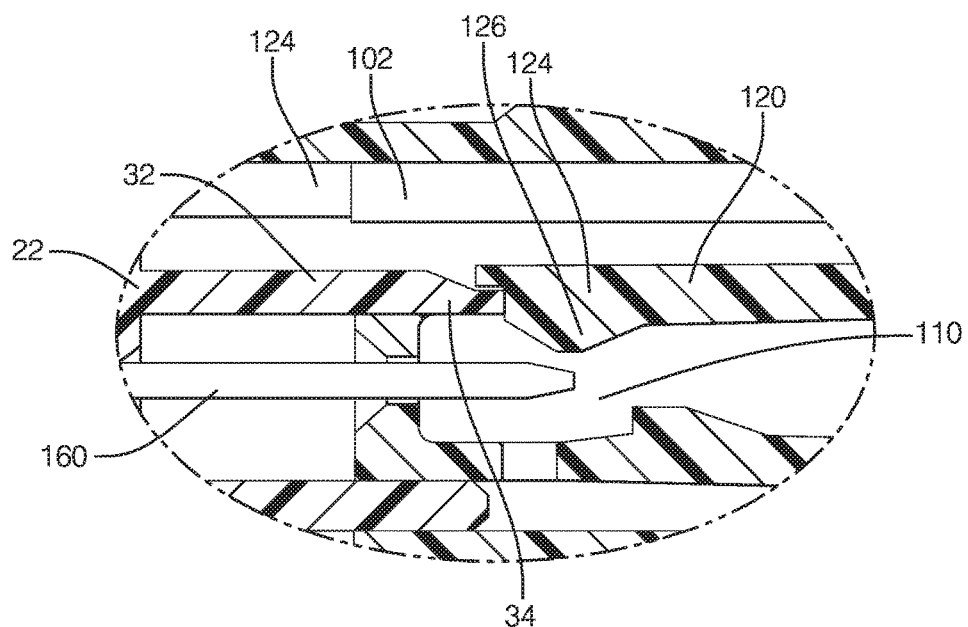
FIG. 4 is a detail view of FIG. 3 according to an embodiment of the invention.

FIG. 4 shows details of FIG. 3. The first blocking means comprises a rigid lance 32 and the second blocking means comprises a flexible arm 120. The flexible arm 120 is flexible in a direction perpendicular to the mating axis M. The rigid lance 32 has a lance end 34 and the flexible arm 120 has an arm end 124. The lance end 34 and the arm end 124 are configured to block each other, thereby preventing movement toward each other, in the blocked position B.

Figure 5:
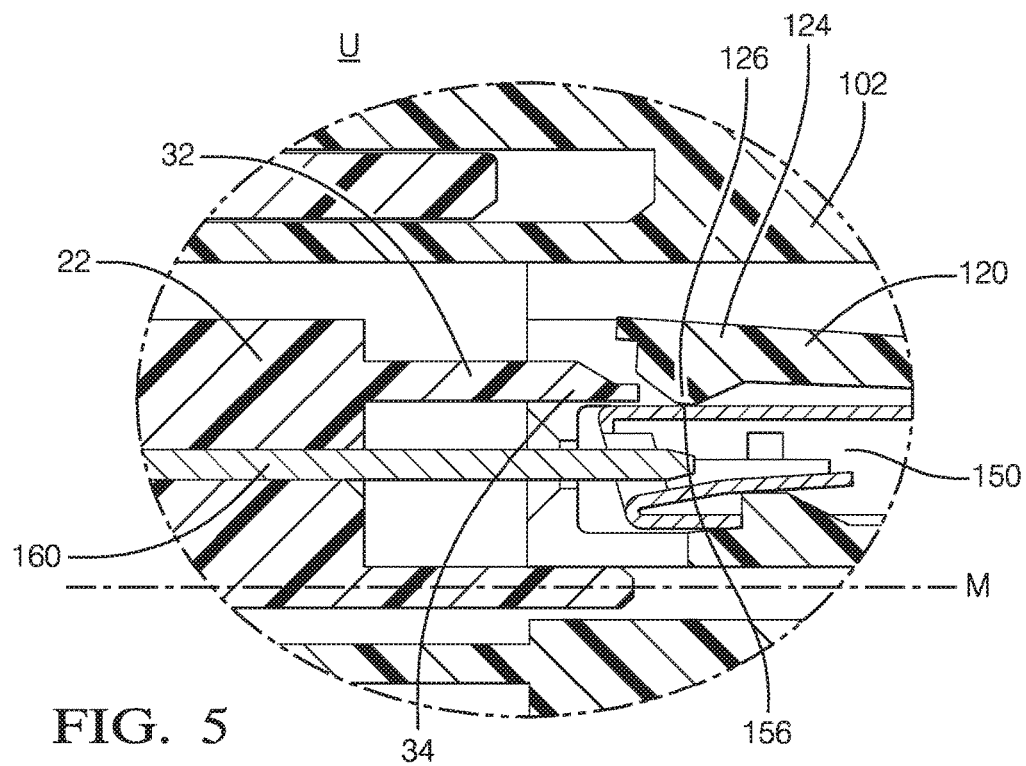
FIG. 5 shows a cross-section view of an electrical distribution assembly along cut line C with enlarged details in an unblocked position according to an embodiment of the invention.

FIG. 5 shows a cross-section view of an electrical distribution assembly 10 along section line C, with enlarged details in an unblocked position U. The electrical distribution assembly 10 further comprises at least one electrical terminal 150 movable from an outward position to an inserted position. The junction box 20 comprises a plurality of plug portion 30, wherein the plurality of plug portions 30 are electrically interconnected by a bus bar 160. Each electrical terminal 150 inserted in the cavity 110 relocates the corresponding first blocking means or the corresponding second blocking means, to release the blocking, thereby allowing movement of the connector housing 102 towards the box housing 22 along the mating axis M. The arm end 124 has a release protrusion 126 protruding inwards the cavity 110. The electrical terminal 150 has a terminal release surface 156. The terminal release surface 156 displaces the arm end 124 by urging against the release protrusion 126 when the terminal is received in the cavity 110. The arm end 124 is positioned in an unblocked position U, allowing movement along the mating axis M.

Figure 6:
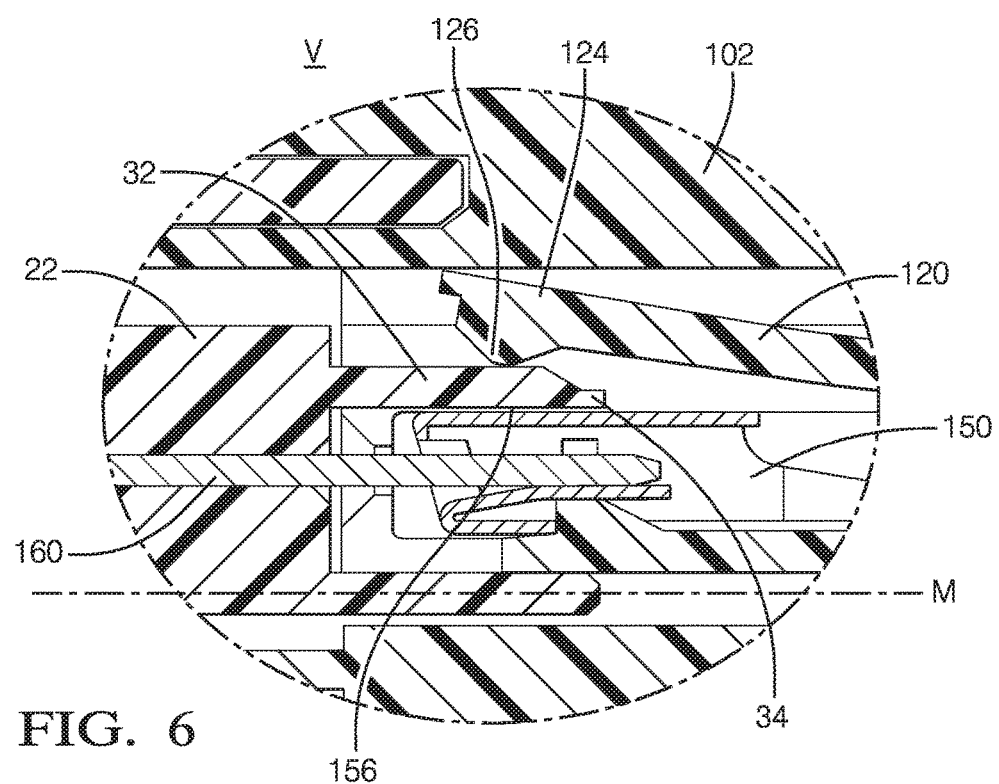
FIG. 6 shows a cross-section view of an electrical distribution assembly along cut line C with enlarged details in a fully mated position according to an embodiment of the invention.

FIG. 6 shows a cross-section view of an electrical distribution assembly 10 along section line C with enlarged details in a fully mated position V. Movement of the connector housing 102 toward the box housing 22 until the fully mated position V is only possible when all cavities 110 of the connector housing 102 are correctly equipped with the intended electrical terminals 150, whereby each electrical terminal 150 displaces each corresponding first blocking means.

Figure 7:
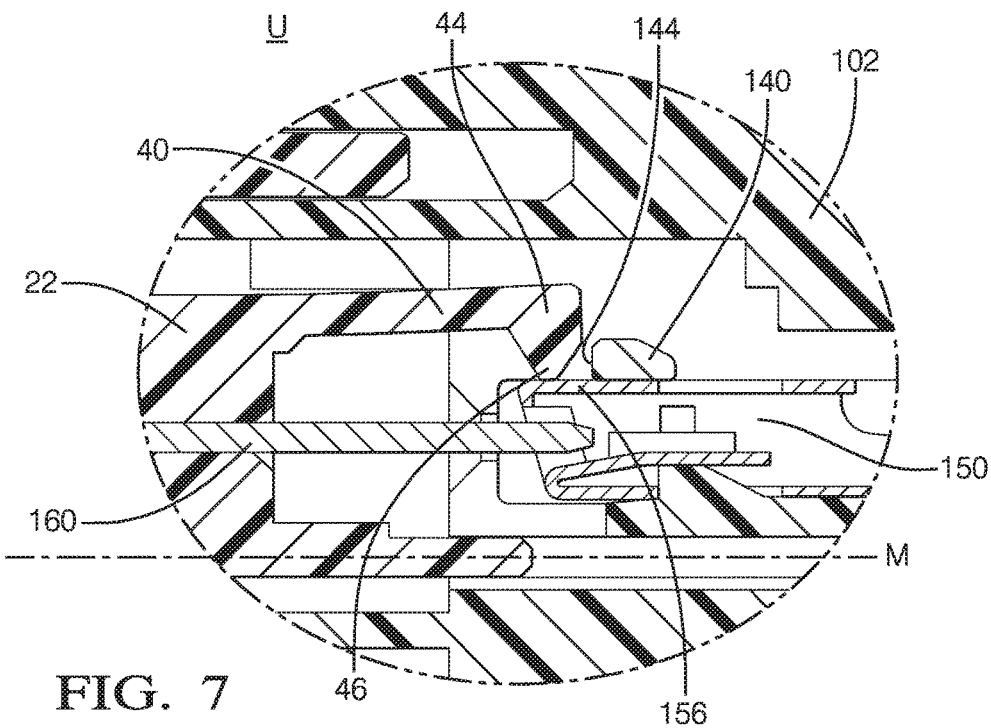
FIG. 7 shows a cross-section view of an electrical distribution assembly along cut line C with enlarged details in an unblocked position according to a second embodiment of the invention.

FIG. 7 shows a cross-section view of a second embodiment of an electrical distribution assembly 10 along section line C, with enlarged details in an unblocked position U. The first blocking means comprises a flexible housing lance 40 and the second blocking means comprises a rigid cavity protrusion 140 protruding perpendicular to the mating axis M into the cavity 110. The flexible housing lance 40 is flexible in a direction perpendicular to the mating axis M. The flexible housing lance 40 has a housing lance end 44 and the rigid cavity protrusion 140 has a blocking edge 144. The housing lance end 44 and the blocking edge 144 are configured to block each other, thereby preventing movement toward each other in the blocked position B. The housing lance end 44 has a housing lance release protrusion 46 protruding perpendicularly to the mating axis M and towards the electrical terminal 150. The electrical terminal 150 comprises a terminal release surface 156. The terminal release surface 156 displaces the housing lance end 44 by urging against the housing lance release protrusion 46 when the terminal is received in the cavity 110. The housing lance end 44 is positioned in an unblocked position U, thereby allowing movement along the mating axis M.

Figure 8:
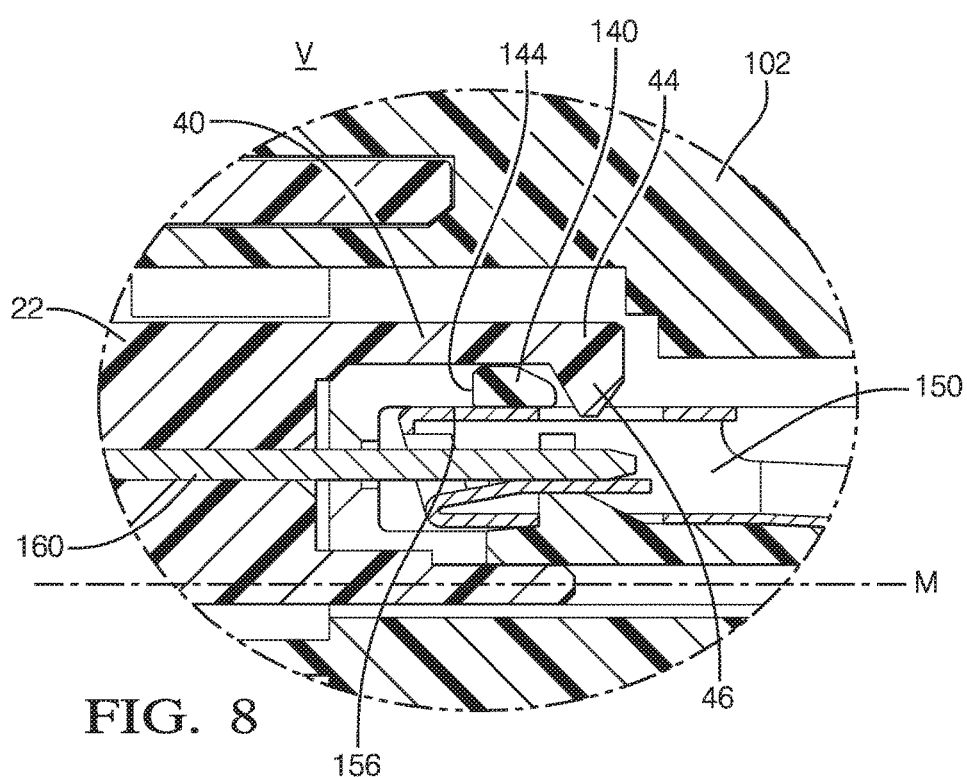
FIG. 8 shows a cross-section view of an electrical distribution assembly along cut line C with enlarged details in a fully mated position according to a second embodiment of the invention.

FIG. 8 shows a cross-section view of a second embodiment of an electrical distribution assembly along section line C with enlarged details in a fully mated position. Movement of the connector housing 102 toward the box housing 22 until in the fully mated position V is only possible when all cavities 110 of the connector housing 102 are correctly equipped with the intended electrical terminals 150, whereby each electrical terminal 150 displaces each corresponding first blocking means. In this embodiment, the first blocking means and the second blocking means are in a relaxed position when the electrical connector 100 reaches the fully mated position V.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical distribution assembly, comprising:
a junction box including a box housing having a plug portion configured to receive an electrical connector, wherein the electrical connector includes a connector housing comprising a plurality of cavities, wherein each cavity is configured to receive and hold a terminal, wherein the plug portion comprises a plurality of first blocking means protruding along a mating axis outwards the box housing, wherein each cavity comprises a second blocking means extending along the mating axis along the cavity, and wherein each of the first blocking means blocks the corresponding second blocking means in a blocked position when the corresponding cavity is empty, thereby preventing movement of the connector housing along the mating axis towards the box housing, wherein the terminal is movable from an outward position to an inserted position, and wherein the terminal, when inserted in the cavity, relocates the corresponding first blocking means or the corresponding second blocking means to release the blocking, thereby allowing movement of the connector housing towards the box housing, along the mating axis.

2. The electrical distribution assembly according to claim 1, wherein the first blocking means comprises a rigid lance and wherein the second blocking means comprise a flexible arm, wherein the flexible arm is flexible in a direction perpendicular to the mating axis.

3. The electrical distribution assembly according to claim 2, wherein the rigid lance has a lance end and wherein the flexible arm has an arm end, wherein the lance end and the arm end are configured to block each other, thereby preventing movement toward each other, in the blocked position.

4. The electrical distribution assembly according to claim 3, wherein the arm end has a release protrusion protruding inwards the cavity, wherein the terminal comprises a terminal release surface, wherein the terminal release surface displaces the arm end by urging against the release protrusion when the terminal is received in the cavity, and wherein the arm end is positioned in an unblocked position, allowing movement along the mating axis.

5. The electrical distribution assembly according to claim 4, wherein the first blocking means comprise a flexible housing lance and wherein the second blocking means comprise a rigid cavity protrusion protruding perpendicular to the mating axis into the cavity and wherein the flexible housing lance is flexible in the direction perpendicular to the mating axis.

6. The electrical distribution assembly according to claim 5, wherein the flexible housing lance has a housing lance end and wherein the rigid cavity protrusion has a blocking edge and wherein the housing lance end and the blocking edge are configured to block each other, thereby preventing movement toward each other in the blocked position.

7. The electrical distribution assembly according to claim 6, wherein the housing lance end has a housing lance release protrusion protruding perpendicularly to the mating axis towards the terminal, wherein the terminal comprises a terminal release surface, wherein the terminal release surface displaces the housing lance end by urging against the housing lance release protrusion when the terminal is received in the cavity, and wherein the housing lance end is positioned in an unblocked position, allowing movement along the mating axis.

8. The electrical distribution assembly according to claim 1, wherein movement of the connector housing toward the box housing until a fully mated position is only possible when all cavities of the connector housing are equipped with terminals, whereby each terminal displaces each corresponding first blocking means.

9. The electrical distribution assembly according to claim 8, wherein the junction box comprises first final locking means, wherein the electrical connector comprises a second final locking means, and wherein the first final locking means and the second final locking means hold the junction box and the electrical connector inseparable together when in the fully mated position.

10. The electrical distribution assembly according to claim 8, wherein the connector housing comprises a guiding protrusion extending towards the plug portion and wherein the box housing comprises a guiding opening configured to receive the guiding protrusion in the fully mated position.

11. The electrical distribution assembly according to claim 1, wherein the junction box comprises a plurality of plug portions and wherein the plurality of plug portions are electrically interconnected by a bus bar.

12. The electrical distribution assembly according to claim 1, wherein the electrical distribution assembly is configured for high voltage application using voltages of about 400 Volt.

13. An electrical wire harness, comprising:
the electrical distribution assembly according to claim 1; and
an electrical wire attached to the terminal.

* * * * *